(12) United States Patent
Curran et al.

(10) Patent No.: US 6,898,580 B1
(45) Date of Patent: May 24, 2005

(54) SINGLE BOARD COMPUTER QUOTATION AND DESIGN SYSTEM AND METHOD

(75) Inventors: Michael A. Curran, Westerville, OH (US); Russell J. Diehl, Pickerington, OH (US); Gary A. Peck, Westerville, OH (US); Kevin L. Rahaman, Columbus, OH (US)

(73) Assignee: Micro Industries Corporation, Westerville, OH (US)

( * ) Notice: Subject to any disclaimer, the term of this patent is extended or adjusted under 35 U.S.C. 154(b) by 732 days.

(21) Appl. No.: 09/589,222

(22) Filed: Jun. 7, 2000

(51) Int. Cl.[7] ............................................. G06F 17/60
(52) U.S. Cl. ..................... 705/400; 700/97; 700/105; 703/1; 716/1; 716/8
(58) Field of Search .................... 700/97, 105, 106, 700/107, 182; 703/1; 705/1, 28, 29, 400; 716/1, 8

(56) References Cited

U.S. PATENT DOCUMENTS

| | | | |
|---|---|---|---|
| 4,831,546 A | * 5/1989 | Mitsuta et al. | 703/1 |
| 4,887,206 A | * 12/1989 | Natarajan | 705/29 |
| 4,964,043 A | 10/1990 | Galvin | 364/401 |
| 5,109,337 A | * 4/1992 | Ferriter et al. | 705/29 |
| 5,117,354 A | 5/1992 | Long et al. | 364/401 |
| 5,119,307 A | 6/1992 | Blaha et al. | 700/107 |
| 5,249,120 A | 9/1993 | Foley | 364/401 |
| 5,255,207 A | * 10/1993 | Cornwell | 703/1 |
| 5,515,269 A | 5/1996 | Willis et al. | 364/401 |
| 5,550,750 A | 8/1996 | Wolff | 364/491 |
| 5,684,713 A | * 11/1997 | Asada et al. | 716/19 |
| 5,793,632 A | 8/1998 | Fad et al. | 364/464.1 |
| 5,870,719 A | 2/1999 | Maritzen et al. | 705/26 |
| 5,898,597 A | 4/1999 | Scepanovic et al. | 364/491 |
| 5,930,499 A | 7/1999 | Chen et al. | 395/500.09 |
| 5,933,145 A | 8/1999 | Meek | 345/348 |
| 5,960,417 A | * 9/1999 | Pan et al. | 705/400 |
| 6,037,945 A | 3/2000 | Loveland | 345/420 |
| 6,083,275 A | * 7/2000 | Heng et al. | 716/19 |
| 6,101,488 A | 8/2000 | Hayashi et al. | 706/45 |
| 6,330,542 B1 | * 12/2001 | Sevcik et al. | 705/8 |
| 6,343,285 B1 | * 1/2002 | Tanaka et al. | 705/400 |
| 6,425,110 B1 | * 7/2002 | Hathaway et al. | 716/2 |
| 6,446,053 B1 | * 9/2002 | Elliott | 705/400 |
| 6,496,957 B1 | * 12/2002 | Kumagai | 716/4 |

FOREIGN PATENT DOCUMENTS

EP          0323382 A2 *  7/1989

OTHER PUBLICATIONS

Venkatachalam: "Design for Manufacturability: A Survival Strategy for the Ameriacan Manufacturing Industry"; Industrial Management, May/Jun. 1992, vol. 34, No. 3, pp. 7–10.*
Sly: "Updating your factory layout drafting and design system: A step–by–step approach"; IIE Solutions, Aug. 1997, vol. 29, n 8, pp. 24–27.*
"SpinCircuit" website homepage printout Apr. 14, 2000 .spincircuit.com/.
"Dot–com craze zeroes in on memory design," *Electronic Engineering EE Times*, Apr. 17, 2000.
Web tool lifts lid on 'design discovery', *Electronic Engineering EE Times*, May 1, 2000.

* cited by examiner

Primary Examiner—Edward R. Cosimano
(74) Attorney, Agent, or Firm—Standley Law Group LLP

(57) ABSTRACT

The present invention is a virtual product designer that allows a user to provide specifications for a custom board level product and receive an instantaneous cost quotation and feasibility assessment of the product. The user may connect through the Internet to a virtual product designer to obtain a cost quotation and design feasibility assessment for a specified product. Functional modules that serve as building blocks for a custom design are defined and stored in a library. Attributes and design parameters associated with the functional modules are used to calculate a cost quotation and evaluate design feasibility. As the user changes design requirements while interacting with the virtual product designer, the user is continually updated on the relevant functional, electrical, mechanical and cost parameters.

28 Claims, 8 Drawing Sheets

140 —

| File Edit View Insert Format Records Tools Window Help |

Virtual Product Designer

What is your form factor?

- ☐ Baby AT
- ☐ LPX
- ☐ ATX
- ☐ NLX
- ☐ POS51
- ☐ cPCI
- ☐ Custom

[← Back]  [Done]  [Next →]

Features of Your Design

Form Factor —
Processor —
Chip Set —
Memory —
Graphics Controller —
Peripheral Controller —
Controller —

— 144

YOUR DESIGN FEASIBILITY

COMPONENT DENSITIES
Single sided assembly area ____%
Double sided assembly area ____%
Panel area used ____%

POWER DISSIPATION
Worst case ____W
Typical ____W

ESTIMATED COSTS <u>2500</u>
Material $____
Assembly labor $____
Overhead and Profit $____

Total estimated cost $____

Production Lead-time ____ weeks

Disclaimer Area

Virtual Product Designer

I/O Controllers?
- ☐ Super I/O Controller
- ☐ 10/100 Base-T Ethernet
- ☐ Serial I/O Ports
- ☐ Digital I/O Ports
- ☐ 1394 Interface
- ☐ GPS Interface
- ☐ Custom

[← Back]  [Done]  [Next →]

Features of Your Design

Form Factor – Custom PCB 5.75 x 8.00 Panel 5.75 x 1.50
Processor – ABC 166 MHz
Chip Set – DEF Chipset
Memory – 32 MByte on board, no cache NVRAM socket
Graphics Controller – XYZ Video, LCD Interface
Peripheral Controller – IDE, Floppy, 2 DSB
Controller – Super I/O, Ethernet

YOUR DESIGN FEASIBILITY

COMPONENT DENSITIES
Single sided assembly area          54 %
Double sided assembly area          36 %
Panel area used                     36 %

POWER DISSIPATION
Worst case                         6.19 W
Typical                            9.90 W ESTIMATED COSTS 2500
Material                         $ 328.20
Assembly labor                   $  93.33
Overhead and Profit              $ 140.51

Total estimated cost             $ 562.04

Production Lead-time             14 weeks

Disclaimer Area

FIG-4

SINGLE BOARD COMPUTER QUOTATION AND DESIGN SYSTEM AND METHOD

BACKGROUND AND SUMMARY OF THE INVENTION

The present invention relates generally to automated design systems. Particularly, the present invention relates to an automated system and method for providing an instantaneous cost quotation and design feasibility assessment of a single board computer (SBC) product based on customer specifications.

Manufacturers of sophisticated electronic equipment such as printers, copiers, medical devices, etc. often have a need to include in their products microprocessor boards that meet very specific requirements. In many cases, the manufacturers arrange for the design and production of custom boards to include in their products. However, manufacturers usually resort to custom boards only when commercially available products will not meet their needs because custom boards are more expensive than mass-marketed boards. Part of the expense can be attributed to the costs involved in evaluating various custom board designs and obtaining cost estimates for each of the design alternatives. Companies that provide custom board services often work with customers in evaluating design options and providing cost estimates. Costs associated with custom board design can be reduced, in part, if the customer can evaluate design options prior to contacting the custom design companies. A system that automates the process of evaluating design options by providing cost estimates and design feasibility could reduce the cost and lead time of providing custom board services.

The present invention is a virtual product designer that allows a user to provide specifications for a custom single board computer product and receive an instantaneous cost quotation and feasibility assessment of the product. In an example embodiment of the present invention, the user connects through the Internet to a web server adapted to accept the user's specifications for a product and to provide a cost quotation and design feasibility assessment for the specified product. Using the present invention, a user can obtain functional cost information for a custom board design very quickly.

The present invention allows a user to take functional modules from a library and configure them into a unique design to support specific microprocessor application requirements. The functional modules consist of the design parameters necessary for the implementation of the specific functions typically associated with a microprocessor design such as processors, memory configurations, etc. The design parameters include the components necessary for the implementation of the function, along with electrical, mechanical, and cost specifications for these components. Functional modules can be combined with other functional modules or they can be combined with user-defined circuit requirements using specific compatibility algorithms to form unique designs. During this design process, the user is continually updated on the functional, electrical, mechanical and cost parameters as features are added to the design.

The present invention automates the process of providing a cost and feasibility analysis for a custom board. As a result, the process of manufacturing a custom board is streamlined and the cost of producing a custom board is reduced. Design as well as delivery time for a custom board is reduced. Consequently, the desirability and affordability of custom boards is increased.

BRIEF DESCRIPTION OF THE DRAWING(S)

FIG. 3 is an example screen for specifying features of a board level product according to an example embodiment of the present invention;

FIG. 4 is an example screen for specifying I/O controller features of a board level product according to an example embodiment of the present invention.

DETAILED DESCRIPTION OF EXAMPLE EMBODIMENT(S)

Figure 1:
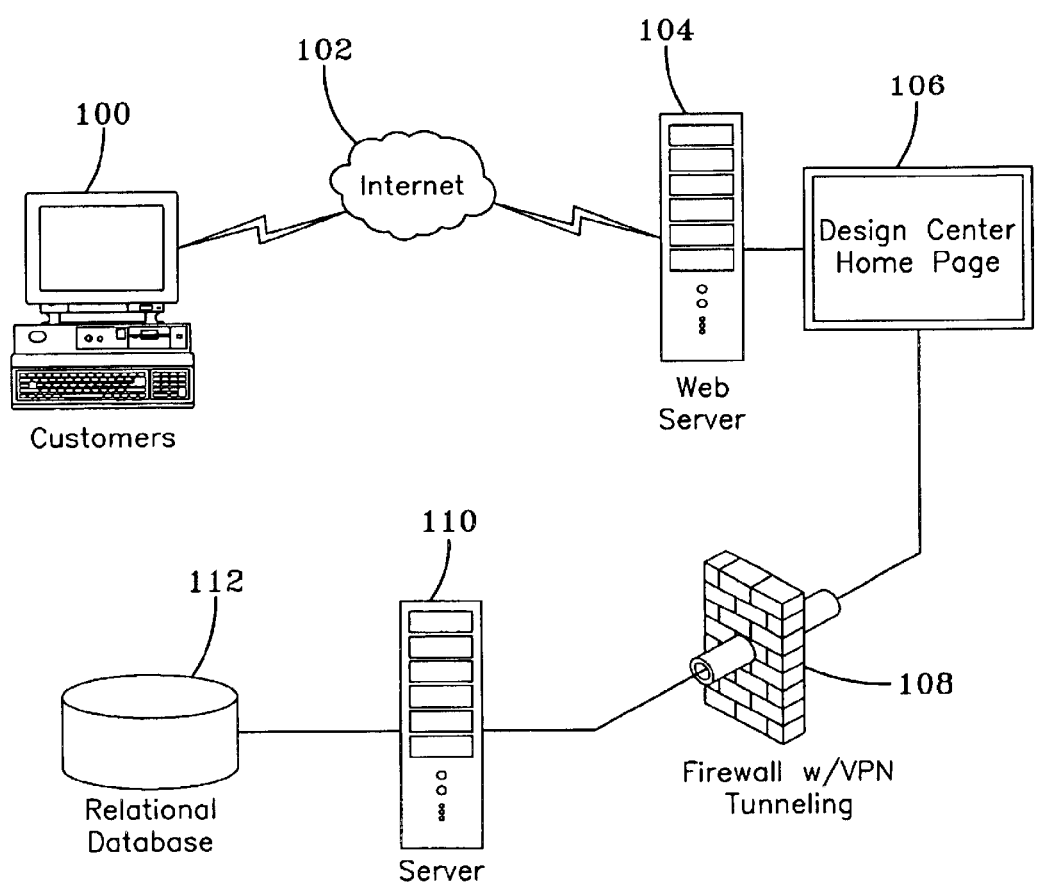
FIG. 1 is a block diagram of an architecture according to an example embodiment of the present invention.

Referring to FIG. 1, the architecture according to an example embodiment of the present invention is shown. The users computer 100 connects via the Internet 102 to a web server 104 that contains a design center home page and other pages of the virtual product designer (VPD) web site through which the user interacts to take advantage of the present invention. The user's computer 100 may be equipped with a browser or other user interface software adapted to present cost and design information to the user. The web server 104 directs the user to the design center home page 106. The home page 106 contains buttons and other interactive controls and forms that provide the user with access to the functional modules that are used in the design process. The detailed data associated with the functional modules is maintained in a relational database 112 running on a server 110 (such as a Windows NT® server) that is isolated from the web server 104 by a firewall with tunneling 108. Information from the relational database 112 is extracted from the server 110 by the web server 104 on a regular basis to ensure that the functional modules contain accurate and timely information.

Functional modules are used to provide a cost quotation and design feasibility assessment. A functional module lists the components that comprise a common microprocessor function. A list of possible functional modules and examples are as follows.

TABLE 1

| Generic functional module | Specific Examples |
| --- | --- |
| Processor | Pentium ® processor, Pentium ® II processor, Pentium ® III processor, Celeron ® processor |
| Cache | 128KB, 256KB |
| Chip Set | TX, BX, 815E |
| Memory (DRAM) | DIMM, embedded |
| Memory (Nonvolatile) | IDE Flash, ISA Flash |
| Graphics | 2MB frame buffer, 4MB frame buffer, flat panel support |
| Expansion Busses | ISA, PCI, AGP, PC/104, PC/104+ |
| Storage Peripherals | EDIE, floppy, SCSI |
| I/O Peripherals | Keyboard, mouse, serial port, parallel port, USB port, touch screen support, sound 10/100Base T Ethernet, SCSI |

Each functional module has attributes associated with it. These attributes describe a relevant characteristic of the functional module. They may be used to more completely describe that functional module and may be used to determine which functional modules may be used together. Some attributes may represent empirically derived characteristics that would override one calculated by individual components.

TABLE 2

| Generic functional module | Attribute | Examples |
| --- | --- | --- |
| Processor | Generic processor type | Celeron ® FC processor |
|  | System bus speed | 66, 100, 133 MHz |
|  | Core voltage | 1.8 V |
|  | Package | BGA2 |
| Cache | Cache size | 128KB, 256KB |
| Chip Set | System bus speeds supported | 66, 100, 133 MHz |
|  | Processors supported (Intel validated) | Celeron ® FC processor |
|  | Busses supported | PCI 32 bits (5), ISA (6), AGP 1X (1) |
|  | Peripheral busses supported | EIDE, USB |
|  | Memory types supported | SDRAM, RDRAM, EDO |
|  | Memory size supported | 1 GB, 4 DIMMs |
|  | External cache supported | Yes or No |
| Memory (DRAM) | Memory type | SDRAM, RDRAM, EDO |
|  | Memory size | 1 GB, 4 DIMMs |
|  | System bus speed | 66, 100, 133 MHz |
| Memory (Nonvolatile) | Nonvolatile memory size | 16MB |
|  | Bus | ISA, EIDE |
|  | Bootable | Yes or No |
| Graphics | Bus | PCI, AGP |
|  | Frame buffer size | 2MB, 4MB |
|  | Flat panel support | Yes or No |
| Expansion Busses | Form factor required | Motherboard |
|  | Bus (loads) | ISA (1), PCI(1), AGP (1) |
| I/O Peripherals | Bus (loads) | ISA (1), PCI(1), AGP (1) |
| All | Power (typical measured) | 5 W |
|  | Size (measured) | 2.5 square inches |
|  | Panel area (measured) | .85 square inches |

Figure 2:
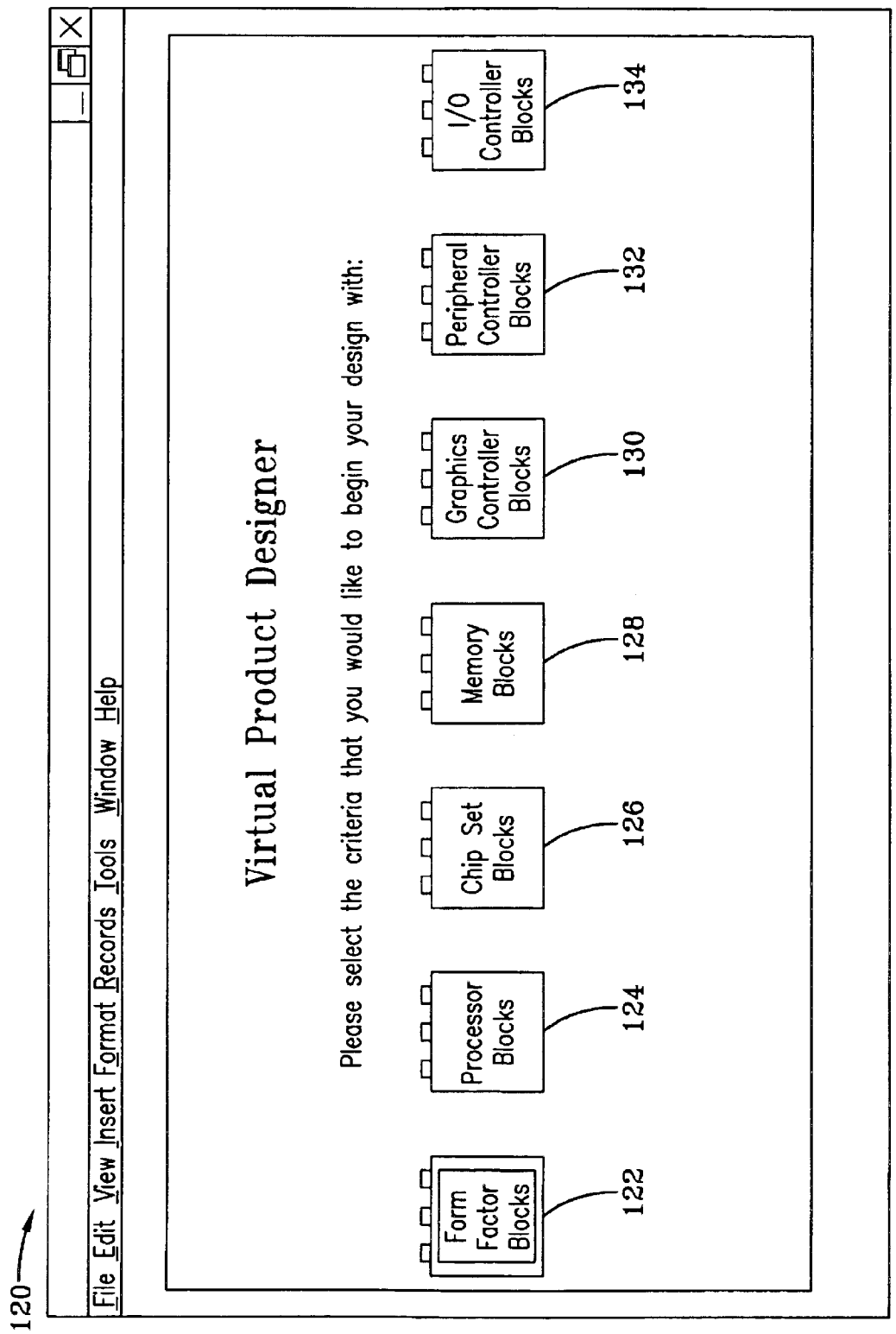
FIG. 2 is an example screen for a home page according to an example embodiment of the present invention.
Figure 5A:
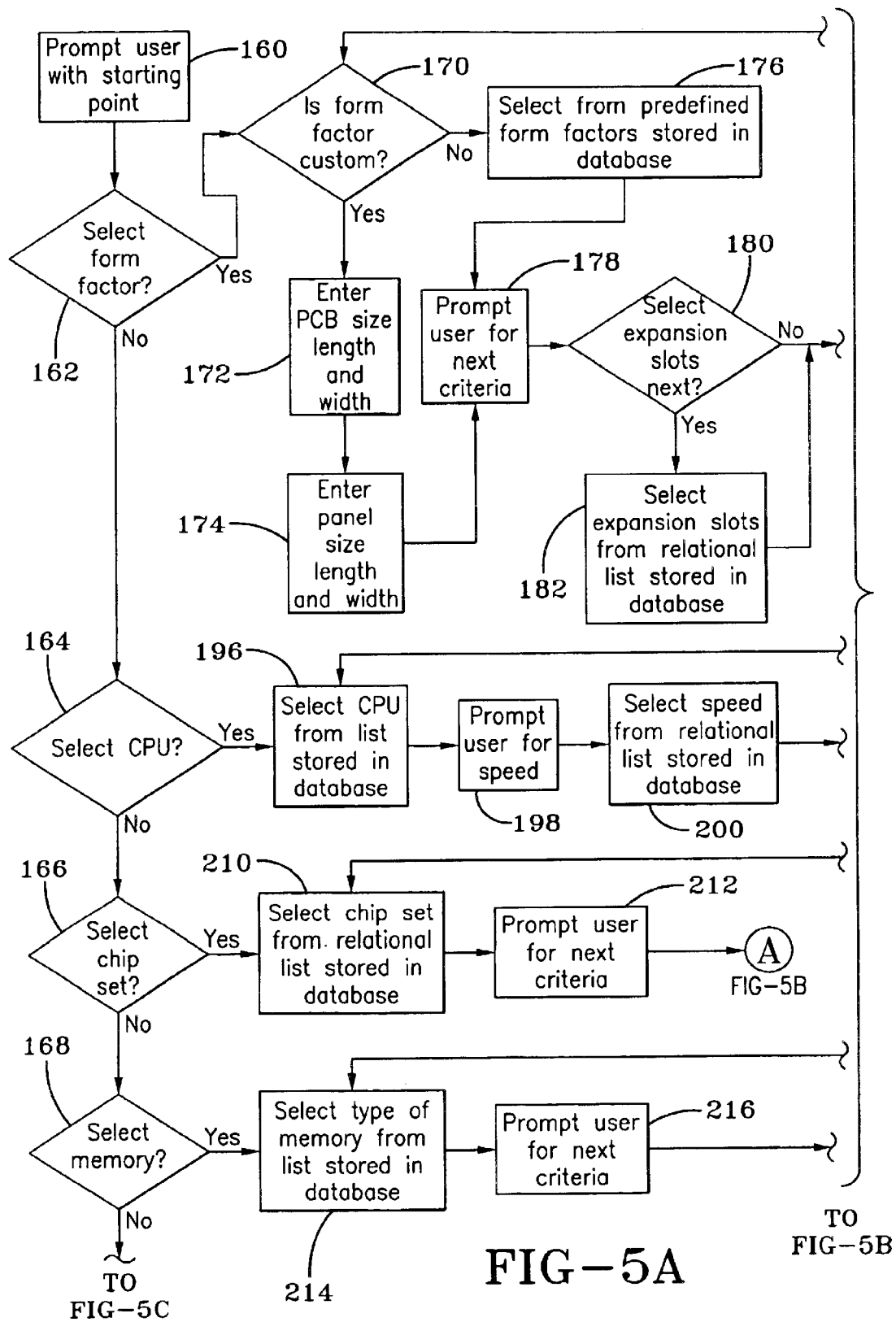
FIGS. 5A–5D are a flowchart of the primary steps for providing a cost quotation and feasibility assessment for a board level product according to an example embodiment of the present invention.
Figure 5B:
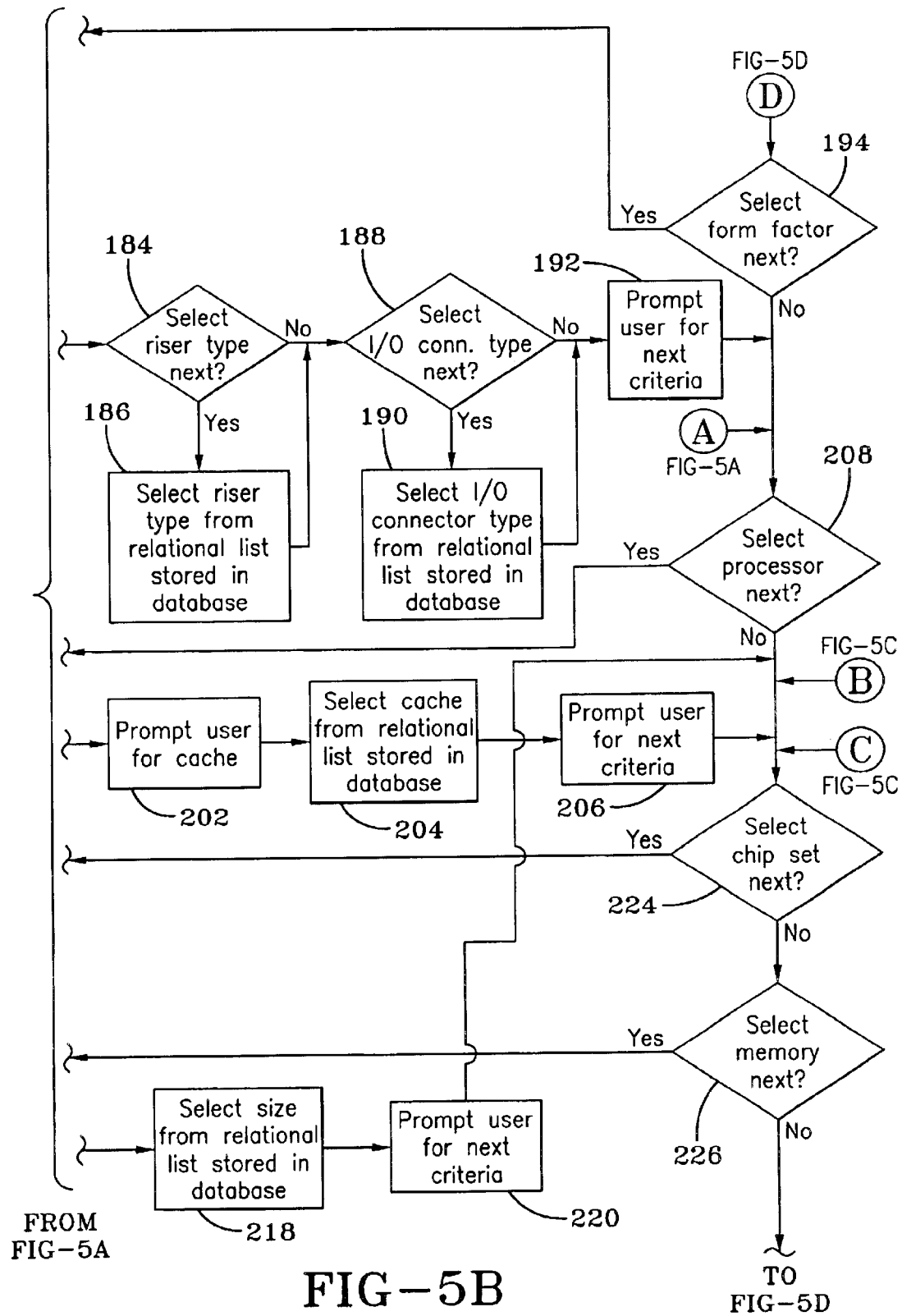
Figure 5C:
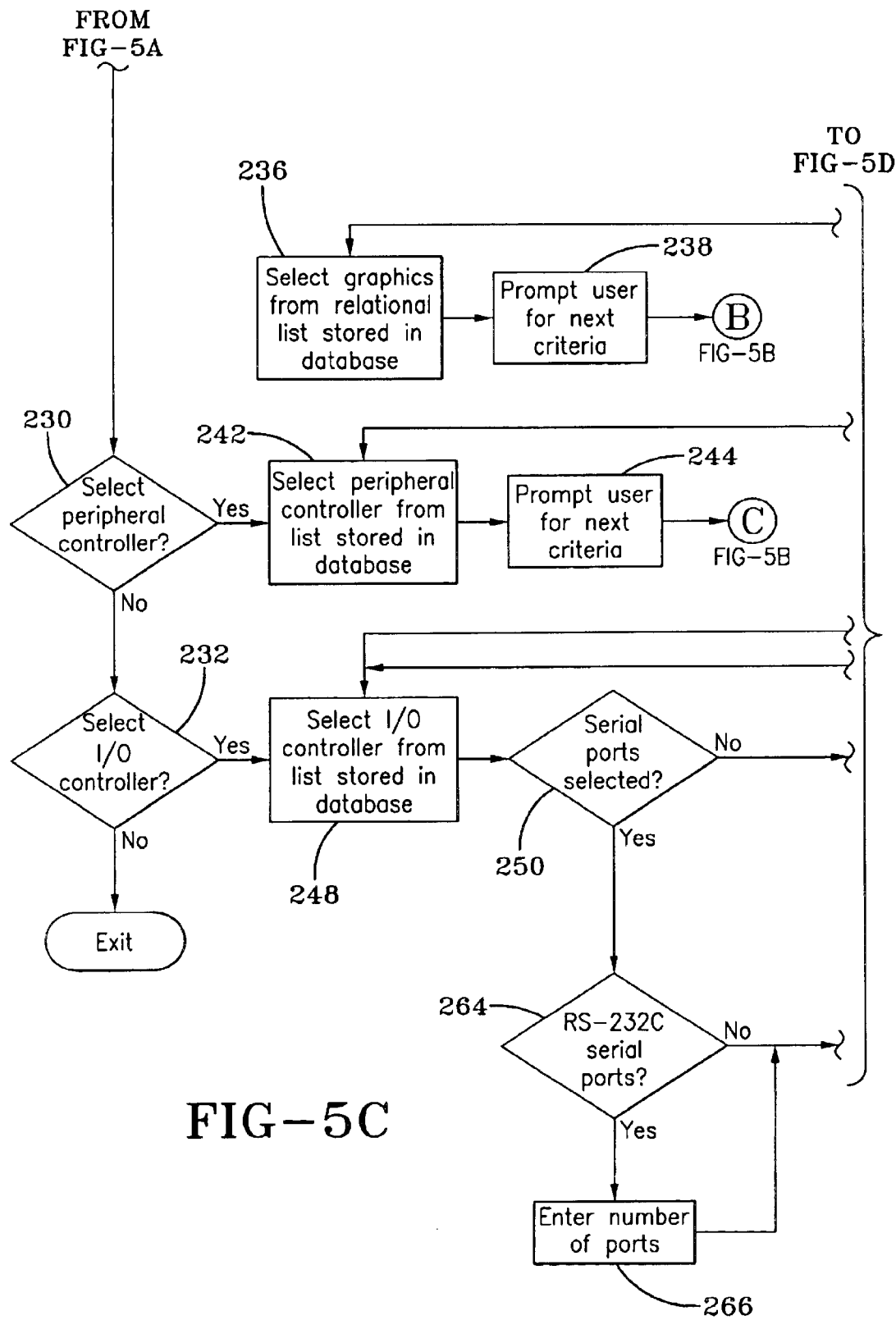
Figure 5D:
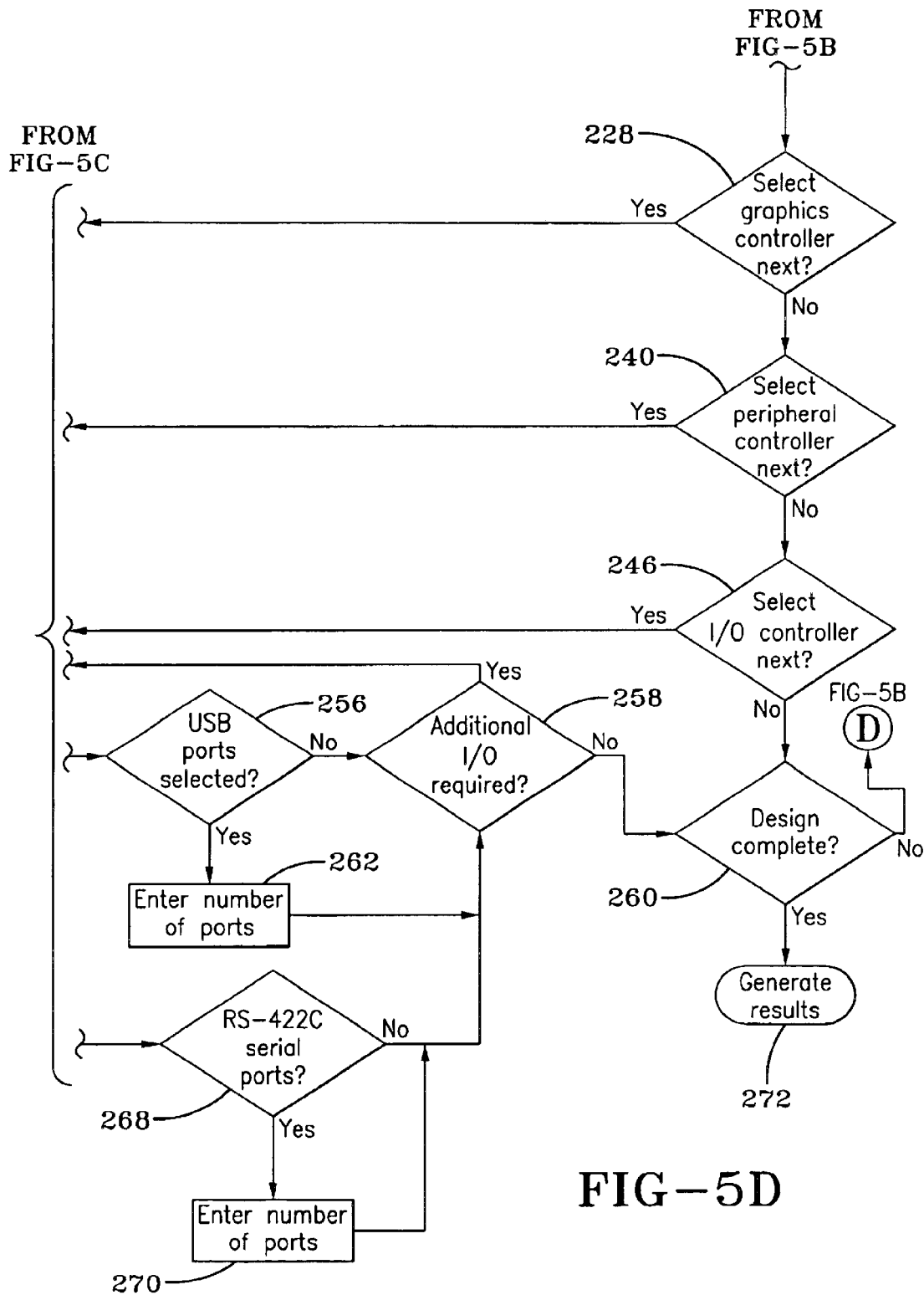

Referring to FIG. 2, an example screen for a home page according to an example embodiment of the present invention is shown. The user determines the functions on the home page 120 that are critical to the application requirements and selects from function blocks (Form Factor Blocks 122, Processor Blocks 124, Chip Set Blocks 126, Memory Blocks 128, Graphics Controller Blocks 130, Peripheral Controller Blocks 132, I/O Controller Blocks 134) in order of their priority. For example, the application may have certain performance objectives but the form factor may not be critical, therefore, the user can specify various processor types to evaluate the cost impacts of the selections without defining the form factor requirements.

Referring to FIG. 3, an example screen for specifying features of a board level product according to an example embodiment of the present invention is shown. As the user continues to define the functional requirements of the product, the VPD updates a product features window 144 and a design feasibility window 146 of the page 140. The product features window 144 lists the function blocks that have been selected for the product. The user can review a detailed specification for a function block at any time by simply double clicking on the selected block. The design feasibility window 146 provides the mechanical characteristics of the product (component density), the electrical requirements (power dissipation), and the product costs (estimated costs). Finally, a disclaimer area window 148 may be used to tell the user about any assumptions or special considerations that factor into the cost quotation or feasibility assessment provided by the system.

The following example illustrates the method that can be used to define a unique product requirement. To initiate the design for a custom form factor with, for example, a Pentium® processor, the user selects a form factor block 122 from the home page shown in FIG. 2. The VPD responds by providing the user with three windows 142, 144, 146 as shown in FIG. 3. The first window is the inquiry window 142 where the user can select the form factor that supports the application requirement. The products feature window 144 lists the functional modules that have been selected by the user. The design feasibility window 146 provides the current feasibility analysis.

As shown in FIG. 3, the user may select from any one of several form factors that are listed in the menu of the inquiry window 142. If the user is creating a custom form factor, the user may select "Custom" from the menu of the inquiry window 142. Next, the user is asked to define the length and width of the custom printed circuit board and the area that is required for panel mount connectors. The user moves from one data field to another by pressing the tab key. When all the data is complete, the user can press the enter key to enter the information into the list of functional modules and move to the next function block. Alternatively, the user can click on the desired function block in the list in the product features window 144 to obtain the inquiry window for the selected block. The user may at any time go back and change the product features by clicking on the desired block. As soon as the form factor is entered into the product features list, the information in the design feasibility window 146 is updated. The user may also review the detailed specifications for a functional module, at any time, by clicking on the selected functional module in the product features list of the product features window 144.

Referring to the product features window 144 of FIG. 3, after the form factor, the next functional module selected by the user is the processor block. The inquiry window 142 advances and the user is given a list of the standard processors that are currently supported. The user may select, for example, a Pentium®. The VPD requests the user to select an operating frequency. By clicking the desired frequency and pressing the enter key, the information is added to the product feature list in the product features window 144 and the design feasibility window 146 is updated. Based on the processor Selection, a compatible chip set is the Intel TX chip set, so this selection automatically appears in the product feature list of the product features window 144. The user can change the chip set by clicking the chip set block in the product features list of the product features window 144. If the user desires to select another chip set that is not compatible with the processor, the processor may be deleted from the product features list to obtain a complete list of available chip sets.

Referring to the product features window 144 of FIG. 3, with the processor and the chip set specified, the user next selects the options from the memory block. The inquiry window 142 advances and the user is given a list of memory options or specifications. If the application requires high reliability, the user may select an on-board memory option with support for 32 MB of SDRAM and no cache memory. The application may also require additional non-volatile memory so the user may select the NVRAM option and specify a M-Systems® flash memory site with no memory installed. The user presses the enter key and the information is entered into the product features list of the product features window 144. The design feasibility window is updated and the inquiry window 142 advances to the graphic controller block. The available graphic controllers are displayed in the inquiry window 142 along with the options associated with each controller. The user may select, for example, the Asiliant™ 69000 graphics controller with the LCD and Video support options. This information is entered and the VPD advances to the peripheral controller requirements.

In the inquiry window 142, the peripheral controller block provides a variety of options such as single or multiple EIDE interfaces, SCSI interface, floppy disk interface and single or multiple USB ports. The user may select the options or specifications required for the application with the VPD insuring that the selected options are compatible. In this example, the user selects a single EIDE interface, a floppy interface, and two USB interfaces by clicking on the options and entering the data into the product feature list and the design feasibility window.

The final block is the I/O controller block. Referring to FIG. 4, an example screen for specifying I/O controller features of a board level product according to an example embodiment of the present invention is shown. The user has a large number of options to select from in the inquiry window 152 and each option contains configuration data that allows the user to select the appropriate interface requirements for the application. For example, the user may decide to configure the product with two serial I/O ports but wants one of the ports configured with an RS-232 interface and the second configured with a RS-422 interface. As the user selects additional I/O options, for example, a 10/100 Base-T Ethernet interface, the VPD ensures that the selected option does not conflict with the design guidelines for the various internal communication interfaces that are required to connect the graphic, peripheral and I/O controller blocks to the chip set and processor. FIG. 4 further illustrates the information displayed in the product features list of the product features window 154, the design feasibility window 156, and the disclaimer window 158 once all of the functional modules are selected. At this point, the user may print out the configuration information in the product features window 154 and the design feasibility window 156 along with the detailed description for each of the standard functional modules. The user also has the option of saving the information in a private directory for future reference or submitting the information to the NT server to obtain a detailed analysis of the non-recurring engineering costs that would be required to implement the product and generate initial prototype units.

As indicated in FIGS. 2, 3 and 4, the present invention uses customer queries (e.g., questions, menus, forms, etc.) to determine the specifications for the custom product the user would like to build. The user may be prompted to select among several options that may be available. The information provided by the user is used to build a bill of materials (BOM) for a cost quotation. The BOM pulls individual part information (e.g., cost, power, size, lead time, placement, etc.) from the relational database to create a quote. The database may be updated regularly to provide current information that is particularly important in determining a cost.

When a customer designates a particular feature or function that is to be included on the board to be quoted (e.g., by selected a particular option), a functional module is identified. The functional modules represent groups of parts that belong to a particular function (i.e., processor, chip set, or peripheral) and are used to build the BOM. The VPD enforces rules and restrictions regarding what functional modules may be used together. With this information, the VPD is able to establish a level of feasibility for the quoted design. Well-known designs may have attributes (such as power dissipation and PCB area, for example) established at the functional module level by empirical methods.

The database for the VPD comprises parts that may be referenced by number. The use of a part number allows access to existing part data such as cost and availability. Each part may have the following attributes.

Material Cost—cost of a component at multiple annual volume levels to provide a good estimation for most designs.

Assembly Cost—assembly labor cost for the component. This value may be multiplied by factors determined by assembly technique (i.e., single or double sided) or component density.

Overhead Profit—additional cost used to compute total cost.

Total cost—sum of material cost, assembly cost, and overhead profit.

Lead Time—lead time for a component. Worst case lead time of all components in a BOM is used as the assembly component lead time.

Minimum Buy—minimum buy quantity for a component.

Power—requirements for power for typical and worst case dissipation.

Size—component dimensions of length, width, and height. The length and width may include any keep out area. For a case in which a device and its socket appear on the same BOM, the socket length and width is the dimension of the socket minus the dimension of the device in the socket. The height is the maximum component height.

The length and width may be used to calculate a component area. The sum of component areas may be compared with the usable component area on a standard form factor board. The user may be given an indication of the component density of the design. The calculated density may also indicate the need for progression from a single sided board, to back side passives only, or to double sided board assemblies. The configuration is a factor in determining the assembly labor for the design.

The length and width dimensions may also be used to check if the component will fit on a standard form factor. The maximum of the component length and width may also be compared to the maximum dimension of the board. If the component is larger than the board, it cannot be used on the board. The height may be compared to the maximum component height allowable for a form factor. Rules and restrictions may be used to disallow the use of particular components on a particular form factor.

Panel Area—total area based on length, width, and height. If a component is usually protruding through a panel, then the width and height that the component uses on the panel may be noted. This information may be used to determine if the number of selected panel components exceeds the space available on the panel for the form factor.

Placement Type—indicates whether a component may be mounted single sided or double sided. Generally, surface mount assemblies are placed single sided with particular passives on the back or double sided. This field designates those devices that can be back side placed on a passives on back design.

Lead Type—indicates whether a component is leaded or surface mounted. This information may be used for determining assembly labor costs.

For form factors, stored parameters in the database may include length, width, usable area, maximum component height, panel area, form factor type, and maximum slots (if applicable). The user may be asked to identify the form factor for the design to be quoted. A form factor may be selected from standard, common PC form factors such as AT, ATX, NLX, cPCI, PICMG, etc.

The form factor sets the board size and therefore, influences the board cost. When providing a quotation, a general formula for cost is $0.08 to $0.10 (depending on volume), times the number of layers, times the area of the board in square inches. The number of layers for a microprocessor design generally ranges from four to eight. The number may be determined by the component density. The area for the board is known for each form factor. The form factor parameters also include the minimum board dimension and the maximum component height allowed. These parameters are used to determine if selected components will fit on a chosen form factor.

A panel area (height and width) may also be designated by a form factor choice. A user may then be warned if the sum of the area of the front panel components exceeds the available front panel area for the form factor. The form factor type and maximum slots attributes are useful for making decisions about the expansion slots that are allowable on the design. For instance, one configuration may allow only seven ISA connectors (maximum slots=7) on an ATX type form factor (form factor type=motherboard).

Appendix A shows a summary listing of various cost data points and design parameters that may be tracked for the various components that may be used in a design. The cost information for the selected components is used to provide a cost quotation to a user. The design parameters and other information for the selected components are used to evaluate the feasibility of a design.

The VPD may comprise a plurality of software modules used to provide the features and functionality of the present invention. For example, the VPD comprises a cost quotation software module that examines the selected functional modules in relation to the selected form factor to determine a cost estimate. A design feasibility software module examines the selected functional modules in relation to the selected form factor to determine if the specified design will work. The attributes of the functional modules are examined for compatibility with each other and to determine if they will fit the form factor. The attributes for the functional modules and form factors, therefore, provide the framework for the rules to determine the feasibility of proposed design. The user may change the selected form factor or the selected functional modules to obtain a new cost quotation.

The output or generated result of the VPD may include the following.

Estimated material cost at multiple volume levels—the sum of all component costs and the estimated PCB cost.

Estimated labor cost at multiple volume levels—the sum of all component assembly labor costs multiplied by any factors for assembly type or component density.

Estimated unit cost at multiple volume levels—the sum of material cost, labor cost, overhead, and profit.

Estimated lead time—the longest component lead time plus a manufacturing lead time of three weeks.

Estimated prototype cost at 5 pieces—the sum of all component costs, plus the estimated PCB cost times a fast turn multiplier, plus the PCB tooling over 5 units, plus overhead and profit.

Feature list—a list of the design's features compiled from the functional module attributes.

Detailed BOM—a list of all the components used on the design, grouped by functional module. Each component has cost, lead time, power, PCB area, panel area, and assembly cost. These attributes are subtotaled for each functional module and totaled for the entire design.

Referring to FIGS. 5A–5D, a flowchart of the primary steps for providing a cost quotation and feasibility assessment for a board level product according to an example embodiment of the present invention is shown. As shown in FIGS. 5A–5D, a user is prompted for information regarding the custom product for which a cost quotation and feasibility analysis is to be provided. In many instances, the user may select a response from a list of possible responses. In other cases, the user may be asked to enter specific values in response to a particular question. In the first step 160, the user is provided with options for defining a form factor (by proceeding to step 162), CPU or processor (by proceeding to step 164), chip set (by proceeding to step 166), memory (by proceeding to step 168), peripheral controller (by proceeding to step 230), and I/O controller (by proceeding to step 232). If the user chooses not to proceed with defining a particular component at any of the steps 162, 164, 166, 168, 230, 232, he may proceed with defining a component at the subsequent step as shown in the progression of steps 162, 164, 166, 168, 230, and 232. If the user selects a form factor in step 162, the user is next asked in step 170 to specify whether the form factor is custom. If the form factor is custom, the user enters a PCB size in step 172 and a panel size in step 174. If the form factor is not custom, the user selects a form factor from a predefined list of form factors in step 176. The user is prompted for additional criteria in step 178. In step 180, the user is asked to specify whether expansion slots are required. If yes, in step 182, the user is asked to select expansion slots from a list. If no, the user moves directly to the next step. In step 184, the user is prompted to select a riser type. If the user chooses to select a riser type, in step 186, the user may select a riser type from a list. If the user chooses not to select a riser type, the user moves directly to step 188 and is asked to select an I/O connector type. If an I/O connector is required, the user may select from a list of I/O connector types in step 190. If an I/O connector type is not required, the user moves directly to step 192 and is prompted for additional criteria (e.g., processor at step 208, chip set at step 224, memory at step 226, graphics controller at step 228, peripheral controller at step 240, or I/O controller at step 246).

In steps 208, 224, 226, and 228, a determination is made as to whether the user would like to select a CPU or processor, chip set, memory, graphics controller, peripheral controller, or I/O controller. If the user selects a CPU or processor in steps 208 or 164, the user is prompted to select a CPU or processor from a list of processors. First, the user selects a CPU from a list stored in the database 196. The user is prompted for the speed in step 198 and may select from a list of speeds in step 200. In step 202, the user is prompted for a cache type and in step 204 may select from a list of cache types. In step 206, the user may be prompted for additional criteria. If the user selects a chip set in steps 224 or 166, the user is prompted to select a chip set from a list of chip sets in step 210 and is prompted for additional criteria in step 212. If the user selects memory in steps 226 or 168, the user is prompted in step 214 to select a type of memory from a list of memory types. The user may be prompted for additional criteria relevant to the memory selection. For example, the user may be prompted for a memory size as in step 216 which may be selected from a list as in step 218. In step 220, the user proceeds with specifying criteria relevant to the product.

If the user selects a graphics controller in step 228, the user is prompted in step 236 to select a graphics controller from a list of graphics controllers. In step 238, the user proceeds with specifying additional criteria relevant to the product. If the user chooses not to select a graphics controller in step 228, the user proceeds to step 240 where he has the option of selecting a peripheral controller. If the user selects a peripheral controller in steps 230 or 240, the user is prompted in step 242 to select a peripheral controller from a list of peripheral controllers. The user proceeds with specifying additional criteria relevant to the product in step 244. If the user chooses not to select a peripheral controller in step 230, the user proceeds to step 232 where he has the option of selecting an I/O controller. If the user chooses not to select a peripheral controller at step 240, the user proceeds to step 246 where he has the option of selecting an I/O controller. If the user selects an I/O controller in steps 246 or 232, in step 248, the user is prompted to select an I/O controller from a list of I/O controllers. The user is prompted in step 250 to specify whether serial ports are required. If yes, the user is prompted in steps 264 through 270 to indicate the number of RS-232C and RS-422C ports to be accommodated. First, the user indicates whether RS-232C serial ports are required 264. If yes, the user enters the number of ports 266. If no, the user proceeds to step 268. At 268, the user indicates whether RS-422C serial ports are required. If yes, the user enters the number of ports 270. If no, the user proceeds directly to step 258 where he indicates whether additional I/O is required.

If the user does not select any serial ports at step 250, the user proceeds to step 256 and is prompted in step 256 to specify whether USB ports are required. If yes, the user specifies the number of ports in step 262. If no, the user moves directly to the step 258 and specifies whether there are additional I/O requirements to accommodate. If yes, the user returns to step 248 and selects another I/O controller. If there are no additional I/O requirements, the user proceeds to step 260.

In step 260, the user indicates whether the design is complete. If not, the user can return to earlier steps to complete the process of providing the specifications for the product. Specifically, the user returns to step 194 where he has the option of selecting a form factor. If the user proceeds with selecting a form factor, he returns to step 170 and proceeds through the steps for specifying a form factor. If the user does not proceed with selecting a form factor, he proceeds to step 208 where he has the option of selecting a processor. If the user proceeds with selecting a processor, he returns to step 196 and proceeds through the steps for specifying a processor. If the user does not proceed with selecting a processor, he proceeds to step 224 where he has the option of selecting a chip set. If the user proceeds with selecting a chip set, he returns to step 210 and proceeds through the steps for specifying a chip set. If the user does not proceed with selecting a chip set, he proceeds to step 226 where he has the option of selecting memory. If the user proceeds with selecting memory, he returns to step 214 and proceeds with the steps for specifying memory. If the user does not proceed with selecting memory, he proceeds to step 228 where he has the option of selecting a graphics controller. If the user proceeds with selecting a graphics controller, he returns to step 236 and proceeds with the steps for specifying a graphics controller. If the user does not proceed with selecting a graphics controller, he proceeds to step 240 where he has the option of selecting a peripheral controller. If the user proceeds with selecting a peripheral controller, he returns to step 242 and proceeds with the steps for specifying a peripheral controller. If the user does not proceed with selecting a peripheral controller, he proceeds to step 246 where he has the option of selecting an I/O controller. If the user proceeds with selecting an I/O controller, he returns to step 248 and proceeds with the steps for specifying an I/O controller. If the user does not proceed with selecting an I/O controller, he proceeds to step 260.

As indicated previously, in step 260, the user indicates whether the design is complete. If not, the user can return to earlier steps to complete the process of providing the specifications for the product. If the design is complete, the user proceeds to step 272. In step 272, the results for the specified product are generated. The results include a cost quotation and design feasibility assessment. The user may return to the start of the process as many times as desired to obtain results for additional products. By requesting more than one quotation and assessment, the user may evaluate the tradeoffs associated with several different design choices and product configurations.

The present invention automates the process of providing cost quotation and design feasibility information for a custom board. A customer using the present invention can design a custom board and verify that the design works. More importantly, a customer can see what various features add to the cost of a custom board. Labor costs associated with providing such information to a potential customer are reduced as a result of the automation of the process. The reduced costs may be passed on to customers so that the use of custom boards is more desirable and affordable.

Although the present invention has been described in accordance with an example embodiment, it is understood that many modifications to the present invention may be made without departing from the scope of the present invention.

What is claimed is:

1. A system for designing a custom board, comprising:
   a plurality of form factors;
   a plurality of functional modules;
   a cost quotation module for determining a cost quotation for a selected form factor in relation to selected ones of said plurality of functional modules;
   a design feasibility module for determining a design feasibility for said selected form factor in relation to selected ones of said plurality of functional modules wherein each selection related to each of said plurality of functional modules is limited according to compatibility with previously selected functional modules determined according to a plurality of functional and physical attributes for each of said plurality of functional modules; and
   a computer adapted to display said cost quotation and said design feasibility for said selected form factor in relation to selected ones of said plurality of functional modules as selections related to said form factor or each of said plurality of functional modules are modified by a user.

2. The system of claim 1 wherein said plurality of functional modules is selected from the group consisting of processors, chip sets, memory configurations, graphics controllers, peripheral controllers, and I/O controllers.

3. The system of claim 1 further comprising a plurality of attributes for each of said plurality of functional modules.

4. The system of claim 3 wherein said plurality of attributes comprise cost parameters, a lead time parameter, a minimum buy quantity parameter, power parameters, size parameters, area parameters, placement parameters, mechanical parameters, and electrical parameters.

5. The system of claim 1 wherein said form factor is selected from the group consisting of AT, LPX, ATX, NLX, cPCI, PICMG, and custom SBC.

6. The system of claim 1 further comprising a plurality of attributes for each of said plurality of form factors.

7. The system of claim 6 wherein said plurality of attributes for each of said plurality of form factors comprises size parameters, area parameters, a form factor type parameter, and a maximum number of slots parameter.

8. The system of claim 1 wherein said cost quotation module and said design feasibility module are operational at a web server accessible via the Internet.

9. The system of claim 8 wherein said computer is adapted to connect to said web server via the Internet.

10. The system of claim 1 wherein said computer is adapted to display an inquiry window, a product features window, and a design feasibility window.

11. The system of claim 10 wherein said inquiry window comprises interactive controls for selecting one of said plurality of form factors.

12. The system of claim 10 wherein said products features window displays features for selected ones of said plurality of functional modules.

13. The system of claim 10 wherein said design feasibility window displays a current feasibility analysis for said selected form factor and selected ones of said plurality of functional modules.

14. A computerized method for designing a custom board comprising the steps of:
  defining a plurality of form factors;
  associating a plurality of functional and physical attributes with said form factors;
  defining a plurality of functional modules;
  associating a plurality of functional and physical attributes with said functional modules;
  prompting a user at a computer to select one of said plurality of form factors;
  determining at said computer which of said plurality of functional modules are compatible with said selected form factor according to said functional and physical attributes for said selected form factor and said functional and physical attributes for said plurality of functional modules;
  prompting said user at said computer to select at least one of said plurality of functional modules determined to be compatible with said selected form factor;
  providing a design feasibility assessment for said selected form factor and said selected functional module, said design feasibility assessment provided by said computer;
  providing a cost quotation for said selected form factor and said selected functional module, said cost quotation provided by said computer; and
  updating for said user at said computer said design feasibility assessment and said cost quotation as selections for said form factor or functional module are changed by said user.

15. The method of claim 14 wherein the step of said prompting a user to select one of said plurality of form factors comprises the step of prompting said user to select a form factor from the group consisting of AT, LPX, ATX, NLX, cPCI, PICMG, and custom SBC.

16. The method of claim 14 wherein the step of associating a plurality of functional and physical attributes with each of said plurality of form factors comprises the step of associating size parameters, area parameters, a form factor type parameter, and a maximum number of slots parameter with each of said plurality of form factors.

17. The method of claim 14 wherein the step of associating a plurality of functional and physical attributes with each of said plurality of functional modules comprises the step of associating cost parameters, a lead time parameter, a minimum buy quantity parameter, power parameters, size parameters, area parameters, placement parameters, mechanical parameters, and electrical parameters with each of said plurality of functional modules.

18. A computerized method for evaluating custom board designs comprising the steps of:
  prompting a computer user to select a plurality of functional modules wherein functional and physical attributes are associated with each of said plurality of functional modules;
  prompting said computer user to specify options for said selected functional modules wherein said options for said selected functional modules are limited to options compatible with said user's prior selections according to said functional and physical attributes of said functional modules;
  displaying for said computer user in a products features window feature information for said selected functional modules and specified options;
  displaying for said computer user in a design feasibility window a design feasibility assessment for said selected functional modules and specified options;
  determining if said computer user has changed said functional modules and specified options; and
  updating said feature information in said products feature window and said design feasibility assessment in said design feasibility window in accordance with changes to said functional modules and specified options.

19. The method of claim 18 further comprising the step of displaying a said design feasibility window.

20. The method of claim 18 further comprising the step of associating a plurality of attributes with each of said plurality of functional modules.

21. The method of claim 20 wherein the step of associating a plurality of attributes with each of said plurality of functional modules comprises the step of associating cost parameters, a lead time parameter, a minimum buy quantity parameter, power parameters, size parameters, area parameters, placement parameters, mechanical parameters, and electrical parameters with each of said plurality of functional modules.

22. The method of claim 18 further comprising the step-of prompting said user to select one of a plurality of form factors.

23. The method of claim 22 wherein the step of said prompting a user to select one of a plurality of form factors comprises the step of prompting said user to select a form factor from the group consisting of AT, LPX, ATX, NLX, cPCI, PICMG, and custom SBC.

24. The method of claim 22 further comprising the step of updating said feature information in said products feature window and said design feasibility assessment in said design feasibility window in accordance with said selected form factor.

25. The method of claim 24 wherein the step of displaying in said design feasibility window a cost quotation comprises the steps of:
  displaying a material cost for said selected functional modules and specified options;
  displaying a labor cost for said selected functional modules and specified options; and
  displaying an overhead and profit cost for said selected functional modules and specified options.

26. The method of claim 22 further comprising the step of associating a plurality of functional and physical attributes with each of said plurality of form factors.

27. The method of claim 26 wherein the step of associating a plurality of attributes with each of said plurality of form factors comprises the step of associating size parameters, area parameters, a form factor type parameter, and a maximum number of slots parameter with each of said plurality of form factors.

28. The method of claim 26 further comprising the step of displaying in said design feasibility window a cost quotation for said selected functional modules and specified options.

* * * * *

UNITED STATES PATENT AND TRADEMARK OFFICE
CERTIFICATE OF CORRECTION

PATENT NO. : 6,898,580 B1  
DATED : May 24, 2005  
INVENTOR(S) : Michael A. Curran et al.

It is certified that error appears in the above-identified patent and that said Letters Patent is hereby corrected as shown below:

Title page,  
Item [56], References Cited, OTHER PUBLICATIONS, "Venkatachalam" reference, please delete "Venkatachalam: "Design for Manufacturability: A Survival Strategy for the Ameriacan Manufacturing Industry"; Industrial Management, May/Jun. 1992, vol. 34, No. 3, pp. 7-10*" and replace it with -- Venkatachalam: "Design for Manufacturability: A Survival Strategy for the American Manufacturing Industry"; Industrial Management, May/Jun. 1992, vol. 34, No. 3, pp. 7-10* --.

Column 2,  
Line 22, please delete "users" and replace it with -- user's --.

Column 12,  
Line 34, please delete "displaying a said design feasibility window." and replace it with -- displaying a said production lead time in said design feasibility window. --.  
Line 46, please delete "step-of" and replace it with -- step of --.

Signed and Sealed this

Eighth Day of November, 2005

JON W. DUDAS  
*Director of the United States Patent and Trademark Office*